United States Patent [19]

Beun et al.

[11] 3,975,709

[45] Aug. 17, 1976

[54] METHOD OF AND DEVICE FOR SKELETONIZING CHARACTERS

[75] Inventors: Matthijs Beun; Pieter Reijnierse, both of Eindhoven, Netherlands

[73] Assignee: U.S. Philips Corporation, New York, N.Y.

[22] Filed: June 12, 1973

[21] Appl. No.: 369,201

Related U.S. Application Data

[63] Continuation of Ser. No. 196,937, Nov. 9, 1971, abandoned.

[30] Foreign Application Priority Data

Nov. 12, 1970 Netherlands................... 7016536

[52] U.S. Cl. ............... 340/146.3 H; 340/146.3 MA
[51] Int. Cl.² ..................................... G06K 9/12
[58] Field of Search .......... 340/146.3 H, 146.3 AG, 340/146.3 MA

[56] References Cited
UNITED STATES PATENTS

3,339,179    8/1967    Shelton........................ 340/146.3 H

*Primary Examiner*—Leo H. Boudreau
*Attorney, Agent, or Firm*—Frank R. Trifari; Daniel R. McGlynn

[57] ABSTRACT

A device for skeletonizing characters imaged on a carrier, according to a two-dimensional regular pattern of positions, said device comprising a detector and storage means associated therewith, said detector feeding information of the characters into said storage means so that the characters are stored as digital information of character positions and background positions, respectively; skeletonizng means for receiving and changing information of character positions into those of background positions until the information of character positions have been reduced to information of character positions of skeleton characters whose stroke elements consist of a single series of character positions which succeed each other in accordance with an adjacency criterion, said skeletonizing means comprising a control unit associated with said storage means for controlling skeletonizing of said characters in cycles, said control unit operative in two modes, a first mode having at least one cycle and a second mode having at least one cycle; a first deciding unit connected to said control unit for receiving during a cycle of the first mode, at least the information of the character positions together with information of positions neighboring those character positions, said first deciding unit incorporating an edge criterion and associating additional information with the information of the character positions to compare whether said character positions satisfy said edge criterion; and, a second deciding unit connected to said first deciding unit for receiving the information of the character positions and those positions neighboring said character positions during said first mode, said second deciding unit incorporating a logic indispensability criterion and comparing the information of said character positions satisfying said edge criterion with said logic indispensability criterion, said second deciding unit receiving during a cycle of said second mode, information of remaining character positions, and comparing the remaining character positions with the logic indispensability criterion irregardless of whether said remaining positions satisfy said edge criterion.

3 Claims, 15 Drawing Figures

INVENTORS
MATTHIJS BEUN
PIETER REIJNIERSE
BY

AGENT

METHOD OF AND DEVICE FOR SKELETONIZING CHARACTERS

This is a continuation of application Ser. No. 196,937, filed Nov. 9, 1971, now abandoned.

The invention relates to a method of skeletonizing characters which are imaged on a two-dimensional regular pattern of positions, a character position being distinguished from a background positon by digital information being present, the characters being skeletonized for removal of redundant information in that the information of a character position is changed into that of a background position until a skeleton character is obtained whose stroke elements consist of single series of character positions which succeed each other in accordance with an adjacency criterion, daid skeletonizing being preformed in cycles. Skeletonizing is performed because a large portion of the image information is redundant. After removal thereof, the character can be more readily recognized by an automatic read unit. A method to this end is known from U.S. Pat. No. 3,196,398, in which the blackness of each character position is indicated by a two-bit binary code. Three blackness levels exist, whilst the information "00" denotes a background position. Skeletonizing is preformed in three cycles, in the first cycle it being possible to remove only the positions having the smallest blackness value, provided this does not cause an interruption of the character, in the second cycle, only the points having the next higher blackness value being removed, and in the third cycle only the positions having the highest blackness value. This method can offer favorable results, but also has disadvantages. First of all, the blackness of a stroke element may vary asymmetrically so that this stroke element is also skeletonized asymmetrically. This also applies if the gradation of the blackness is slight so that all character positions have the same blackness value; this may, of course, also be applicable to only a portion of the character. The decisions as regards the removal of character positions will usually be taken consecutively, for example, by scanning the pattern one line after the other from left to right. In that case only the extreme right-hand character position of a stroke element of the character crossing this line will be retained, so that distortion arises. However, if said stroke element terminates on that line it is truncated. If the matrix is further scanned from the top downwards, such a stroke element may be truncated from its top down one line after the other, so that skeleton character may become unrecognizable. However, in order to make the skeleton skelton character approximate the heart lines of the character and, moreover, to be able to remove all redundant information, the invention is characterized in that said cycles are divided into at least one cycle of a first mode which is followed by at least one cycle of a second mode. The first mode character positions which are situated at the edge of the character are marked in accordance with an edge criterion by associating additional information with the information of these character positions, after which said character positions thus marked are removed or retained, respectively on the basic of an indispensability criterion. During a cycle of said second mode all character positions are tested against an indispensability criterion, after which they are removed or retained, respectively, on the basis of an indispensability criterion. Due to the use of the edge criterion characters are symmetrically skeletonized; by testing all characters against the indispensability criterion in a cycle of the second mode, a maximum amount of redundant information is removed and the pure heart line remains.

The successively further marking of character positions in order to enable their removal is known from U.S. Pat. No. 3,339,179. However, in this specification the criterion for making is very complicated and does not so much take into account the edge, but rather the fact whether a character position is situated near the center of a stroke element, or rather yet at a three-stroke or four-stroke junction. Moreover, FIG. 3 of the aforementioned patent shows that various reduntant character positions are still present in the skeleton character. According to the present invention, all character positions are tested in a cycle of the second mode, so that all remaining character positions satisfy the indispensability. At the end of the cycles of the first mode the character is identical, apart from a small number of character positions, to the skeleton character to be formed. In order to reduce the risk of erosion of character ends, and still enable the removal of any small projections during cycles of the first mode, an advantageous method according to the invention is characterized in that during cycles of said first mode an indispensability criterion applies which comprises at least one first sub-criterion preventing any removal which would cause an interruption. The indispensability criterion comprises during cycles of said second mode, a second sub-criterion in addition to the said first sub-criterion which prevents removal of a character position tested against said indispensability criterion, if this character position has only one neighboring character position. This means that the tested character position constitutes an end of a character, which end might be unduly eroded by removal of said tested character position.

The said regular pattern is often a matrix composed of rows and columns, and a small matrix thereof is used for testing against the edge criterion. If the matrix is scanned in a cycle, for example, one line after another, from left to right, it may be that a stroke element of the character extends to the left approximately horizontally and ends free, such for example, the horizontal portion of a character "7". It may then be that at the end of said stroke elements many character positions satisfy the edge criterion so that they could be removed because, going from left to right, there will never be an interruption. However, if this concerns too large a number of character positions, the horizontal stroke element might be unduly eroded too much. In order to prevent this, an advantageous method according to the invention is characterized in that said indispensability criterion comprises, during at least one cycle of at least one of said two modes, a third subcriterion. The third subcriterion determines whether a character position tested against said indispensability criterion forms part of a number of neighboring character positions to be tested against said indispensability criterion, and forming a block, it is possible for said block to be further surrounded by a number of background positions. The block can constitute an end of a character which might be unduly eroded by removal without said first and second sub-criterion taking effect, whereby the third sub-criterion changes the additional information of at least one of the character positions to be tested and forms part of said block, so that this character position is not tested against said indispensability criterion. Because one of the character positions is not tested against the indispensability criterion, the relevant stroke element is retained by the action of said first sub-criterion. The same may also apply during a cycle of said second mode.

An advantages of this method according to the invention is characterized in that the completion of cycles of said first mode is terminated if at the most a predetermined number of character positions was removed during the last completed cycle of said first mode. It is possible for said number to be zero. If no further character positions were removed in a cycle of said first mode, the further completion of one or more cycles of the first mode no longer makes sense. In that case, a change-over is made to the second mode. However, it is alternatively possible to present another number, for example, 1 to 3, so that it is usually avoided that a cycle in which no character position is skeletonized is to be completed. The said number can be preset or be automatically adjusted, depending on the results with previous characters.

The invention also relates to a device to be used for skeletonizing characters, said characters being imaged on a carrier, comprising a detector which images the information of the characters in a provided storage device so that said characters are stored as digital information of character positions and background positions, respectively. The positions are arranged on the carrier according to a two-dimensional regular pattern of positions. It is possible to supply at least the information of character positions to said skeletonizing device. It is possible to change the information of character positions thereby into that of background positions until the information of character positions stored in said store has been reduced to the information of character positions of skeleton characters whose stroke elements consist of a single series of character positions which succeed each other in accordance with an adjacency criterion. Skeletonizing is controlled in cycles by a control unit. The detector is, for example, a flying spot scanner or a row of photosensitive cells, and the storage unit may have a two-dimensional character (matrix store) or a one-dimensional character (shift register). In each case the information is regularly arranged, so that the stored information of various storage elements can be compared. Character positions are stored, for example, as ones, and background positions are stored as zeros. The reduction of the number of ones offers two possible advantages: on the one hand, the redundance is reduced without indispensable information being destroyed. On the other hand, this reduced information can be stored in a smaller store for further processing so that storage space can be saved. Skeletonizing is performed advantageously in the invention in that said control unit has two positions, one for performing at least one cycle of a first mode, and one for performing at least one cycle of a second mode. In a cycle of said first mode, at least the formation of the character positions can be applied, together with the information of the positions neighboring those character positions, to a first deciding unit in which an edge criterion is incorporated. The first deciding unit associates additional information with the information of the character positions having satisfied the said edge criterion, after which both types of information can be applied to a second deciding unit, together with the information of the positions neighboring those character positions. The second deciding unit incorporating a logic indispensability criterion, and said second deciding unit changes the information of said character positions into that of background positions, if the edge criterion has been satisfied but the indispensability criterion has not been satisfied, after which this changed or unchanged information, respectively, appears on the output. It is possible in a cycle of said second mode to apply the information of all said character positions which are still present to an input of said second deciding unit. The said second deciding unit neglects the fact whether the edge criterion has been satisfied or has not been satisfied, and changes the information of said character positions into that of background positions if an indispensability criterion has not been satisfied. The additional information can then be stored in the same in an additional store.

A preferred embodiment of the device according to the invention is further characterized in that said deciding unit comprises a first and a second circuit for a first and a second indispensability criterion, respectively. It is possible to activate said circuits by said control unit, said control unit activating only the first circuit during cycles of said first mode, but activating both circuits during cycles of said second mode. The first circuit supplying a signal if removal of a character position would cause an interruption, and said second circuit counting the number of character positions neighboring said character position, and supplying a signal if this number amounts to one, which means that the character position constitutes an end of a character. The character might be unduly eroded by removal of said character position, the second deciding unit being capable of preventing the removal of the relevant character position under the control of at least one of the signals. This is because at the end of the first mode the character is identical, apart from a small number of redundant character positions, to the skeleton character to be formed. In order to reduce the risk of erosion of the character ends, the second sub-criterion is applied in the second mode.

The regular pattern often consists of a matrix of rows and columns, the information of the character positions of which can be applied to a deciding unit in a fixed sequence, a small matrix of the matrix being used for testing against the edge criterion. If the matrix is scanned one line after the other from left to right during a cycle, it may that a stroke element of the character extends approximately horizontally from left to right, and ends free such as, for example, the horizontal portion of a character "7". It may then occur, that at the end of said stroke element, many character positions satisfy the edge criterion, so that they might be removed because, going from left to right, there will never be an interruption. However, if this concerns too large a number of character positions, the horizontal stroke element might be unduly eroded. In order to avoid this, a preferred embodiment according to the invention is characterized in that said deciding unit comprises a third circuit for a third indispensability sub-criterion which compares the information of character positions with the information of at least three character positions neighboring this character position. The third circuit supplying a signal if these character positions, forming a block, are all provided with said additional information, and may furthermore have a number of background positions as neighboring positions so that said marked block can constitute an end of a character which might be unduly eroded by removal of said character positions without the sub-criteria generated by said first and said second circuit having the possibility of becoming effective. It is possible to change the additional information of at least one of said marked character positions by said signal of said third circuit, such that this character position is not tested against said indispensability criterion. As in that case, one of the character positions is not tested against the indispensability criterion, and the relevant stroke element is subsequently retained due to the action of said first sub-criterion. The same can also apply during a cycle of said second mode.

A preferred embodiment of the invention is characterized in that a bistable device is provided, having a first position and a second position, and a counter, the first position controlling the said first mode and the said second position controlling the said second mode. The bistable device being set to the first position at the beginning of a cycle of said first mode by a start signal, said counter counting the remove signals of removed character positions and supplying a signal when a given position is reached. At the end of that cycle, said start signal can be generated, where, if said position is not reached during a cycle of said first mode, the bistable device reaches the second position at the end of that cycle. It is possible to generate a signal at the end of a cycle of said second mode, in order to signal the completion of skeletonizing.

In order that the invention may be readily carried into effect, some embodiments thereof will now be described in detail, by way of example, with reference to the accompanying diagrammatic drawings, in which.

Figure 1:
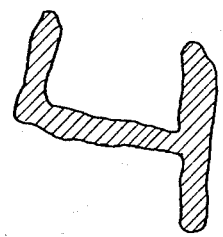
FIG. 1 shows a character "4"
Figure 2:
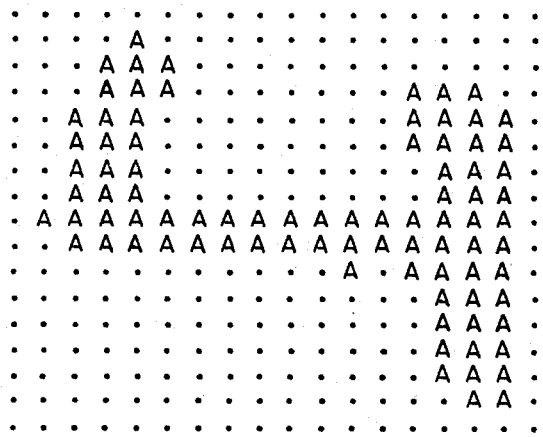
FIG. 2–5 show the processing stages.
Figure 3:
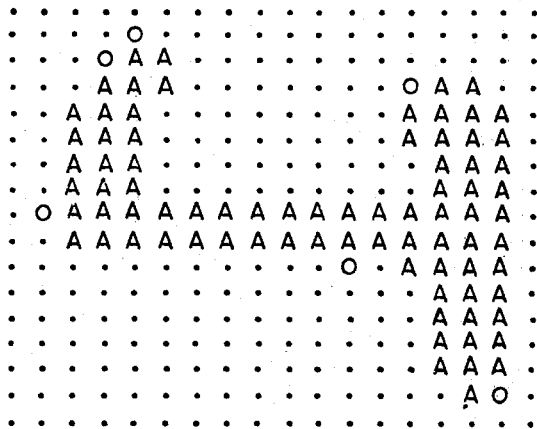

FIG. 1 shows a hand-written character, the information being bi-valued, binary black or binary white. FIG. 2 shows the image of this character on a square matrix, the character positions being denoted by a letter A and the background positions being denoted by a dot. In FIG. 3 the smoothing of the edge is illustrated. In this figure, and also hereinafter, a character position is considered together with the information of the eight neighboring positions in a 3 × 3 matrix (neighbors). The criterion for smoothing is that a character position is removed if it has less than four neighbors. A corresponding method is used for filling voids. The invention, however, does not relate to smoothing, which may also be omitted.

Figure 4:
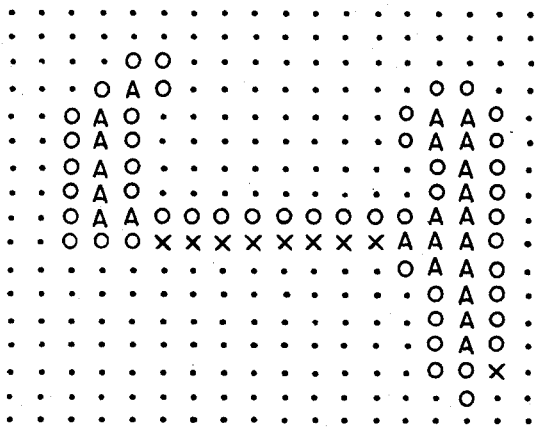

FIG. 4 shows the result of a first skeletonizing cycle. First all positions satisfying the edge criterion are marked: if less than two character positions occur in the first column of the said 3 × 3 matrix, and more than three character positions occur in the remainder of the matrix (including the character position in the center), the character position in the center is marked. A similar method is followed by always counting (successively or simultaneously) the number of character positions of the last column, the number of the last row, and the number of the first row, and also the number of character positions in the remainder of the matrix. If the edge criterion is satisfied in at least one of the four cases, the character position in the center is marked: this is indicated in FIG. 4 by a cross or a circle in the relavent position. Background positions are always denoted by dots. After all positions satisfying the edge criterion have been marked, all marked positions are subsequently reconsidered an removed if this does not cause an interruption between two marked, or not marked, character positions still present. In the successive consideration of the marked character positions, one line after the other from left to right, starting at the top, a first interruption appears to arise at the lower line of the horizontal stroke element of the "4"; consequently the relevant removals are rendered invalid, which is denoted by crosses in the relevant character positions. Finally, a mark has also been rendered invalid in the right-hand lower corner. This is because an interruption would otherwise arise between the vertical stroke element at the right and the marked but still present character position on the lower line. The latter is removed only upon scanning of the lower line. If a start were made at the bottom, no removal would have been rendered invalid in this case, which demonstrates that the shape of the skeleton character may be dependent on the sequence in which the character positions are tested against the indispensability criterion. In the next cycle of the first mode (FIG. 5) all character positions are considered again (crosses and circles). At the top of the right-hand vertical stroke element a block of four character positions is marked, the removal of which will not cause an interruption, provided a start is made at the top. In this case removal would not be fatal for recognition, but there are also cases were such a double column extends, for example, as for as the horizontal stroke element, and then this whole column would disappear. Consequently, when considering the character position of a block of four marked character positions which is situated at the left top, the marking of the character position situated at the right top is invalidated (so that the latter is not tested against the indispensability criterion), under the condition that the other five positions of the 3 × 3 matrix are background positions. Consequently, during this cycle five character positions are removed, and five other removals are prevented. The latter can always be effected by removing the marking. During a subsequent cycle, no further character positions are marked, but it is obvious that the character position surrounded by a solid-line square at the left is redundant, which may make recognition more difficult. For example, a more severe edge criterion may be used: if less than two character positions are present in the first column of the 3 × 3 matrix and more than two character positions are present in the remainder (including the central character position), the central character position is marked. However, in that case more severe criteria are also to be drafted so as to counteract erosion of ends, but it is difficult to predict whether projecting character positions constitute an end or not. Excellent results could be realized using the main thought of the invention:

marking all character positions in a cycle of a second mode.

Figure 5:
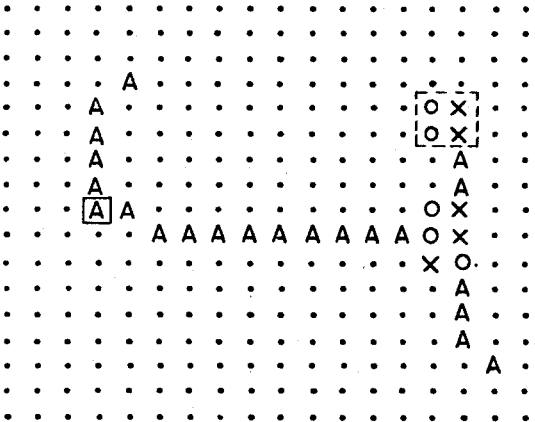

The second cycle of the first mode may also be followed by a third one. FIG. 5 shows that in that case, no further position is removed, so that this last cycle is superfluous. The completion of cycles of the first mode can be terminated if at most, a predetermined number of character positions is removed in the last completed cycle of the first mode. In the case under consideration, this number may be set, for example, at eight. In that case two cycles of said first mode are required. If the number has been set, for example, at 50, only one would be required (as 48 positions are removed in the first cycle). In many cases acceptable skeleton characters can thus be found.

The number can be permanently chosen, for example, but, if desired, it can also be derived from the results of one or more previous cycles. Subsequently, one cycle of a second mode is completed, in which one further character position can be removed (shown in the solid-line square). After that the skeleton character is ready for further processing and/or recognition.

Figure 6A:
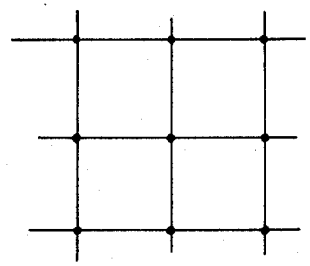
FIGS. 6a through 6d show diagrams of some possible patterns of positions.
Figure 6B:
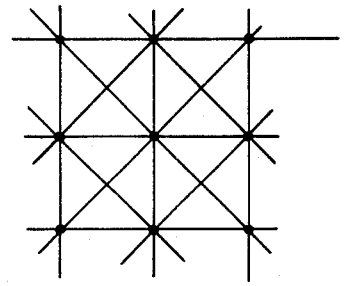
Figure 6C:
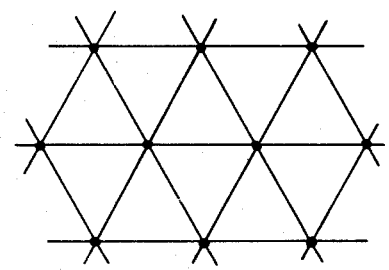
Figure 6D:
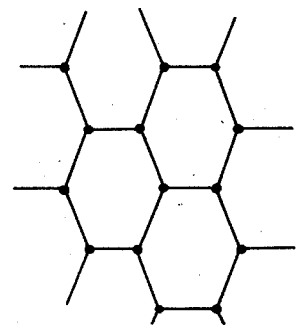

FIGS. 6a, b, c, d show the most commonly used patterns of positions, each position having 4, 8, 6 and 3 neighbors, respectively. Other patterns can be formed therefrom by varying the scale, for example, in that the elementary squares of FIG. 6a are changed into parallelograms or rectangles.

Figure 7:
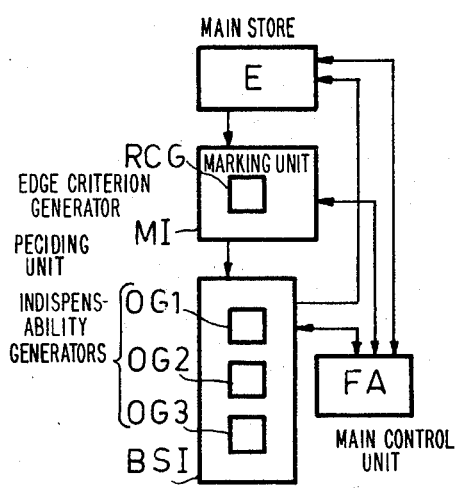
FIG. 7 shows a block diagram of a device according to the invention.

FIG. 7 shows a block diagram of a device according to the invention, comprising a main store E, a marking unit MI, comprising an edge criterion generator RCG, and a deciding unit BSI, comprising three generators for three indispensability sub-criteria OG1, OG2 and OG3, and a main control unit FA. The information of the character is assumed to be stored in the main store E. Under the control of the main control unit FA the latter information is applied to the marking unit MI. In this unit the information of a character position and of any neighboring character positions of this character position is tested against an edge criterion which is generated in the marking unit MI by the logic edge criterion generator RCG. The result of this test is applied to the deciding unit, together with the information of the character positions and of any character position neighboring this character position. Depending on the signals from the main control unit FA, the information is tested against one of the indispensability subcriteria generated by the generators OG1, OG2 and OG3, after which it is decided whether or not the character position under consideration may be removed. Subsequently, the information of the remaining character positions is returned to the main store E. One cycle is thus completed, and it is determined whether it was a cycle of the first or of the second mode by the setting of MI and the use of the indispensability criteria. The main control unit FA may also receive signals from E, MI and BSI, as is indicated by arrows. The main control unit FA can adjust its operation on the basis of these signals, for example, starting, changing over from the first to the second mode, and stopping.

Figure 8:
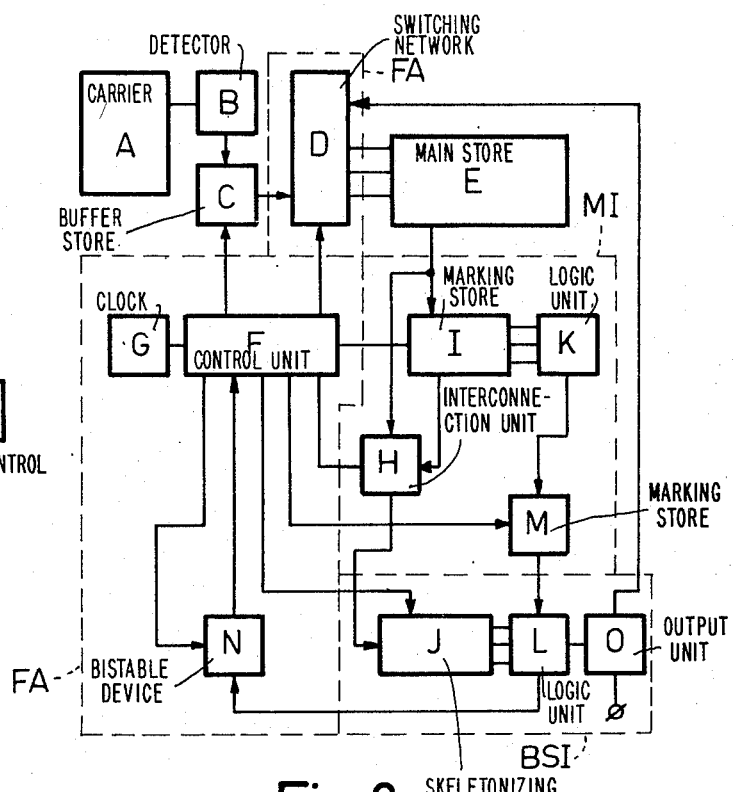
FIG. 8 shows a more detailed block diagram of a device according to the invention.

FIG. 8 shows a more detailed block diagram of a device for performing the method according to the invention, comprising a carrier A with the characters to be recognized, a detector B, a buffer store C, a switching network D, a main store E, a control unit F, a clock G, an interconnection unit H, a marking store I, a skeletonizing store J, a logic unit K, a second logic unit L, a mark store M, a bistable device N and an output unit O.

In addition, broken lines denote which components form part of the main control unit FA, the marking unit MI, and the deciding unit BSI shown in FIG. 7. The carrier A is, for example, a sheet on which characters are written in ink of a contrasting colour. The detector is, for example, a flying spot scanner which each time scans a line of a character from the top downwards. This information is written in a store, one line after the other, on the basis of a criterion which in its simplest form is bi-valued, i.e. "occupied" or "void". The buffer store C is, for example, a shift register in which the information of a line can be stored and which may contain, for example, 32 bits. The main store E may also be constructed as a shift register. The clock G supplies pulses at regular intervals to the control unit F which controls the further course of events. The buffer store C is sometimes required for adapting the properties of the detector and the main store E to each other. If E is also a shift register constructed, for example, according to *most* techniques, and therefore requiring, for example, a fixed clock pulse frequency, this clock frequency may differ from the scanning frequency of the line points. For example: the sweep frequency of the flying spot scanner is constant but the interrogation instants are controlled such that there are always 32 interrogation points per character line, independent of the character dimensions. After completion of a line of the character, the information of that line is transported via the switching network D under the control of the control unit F. The character may consist of, for example, 32 lines of 32 bits each. This was also the case in the FIGS., 2 to 5, but in these figures part of the matrix is omitted so as to save space. When all information of the character has been stored in the main store E, skeletonizing commences, redundant information being separated. For this purpose a ring-circuit is formed, for example, by through-connection of the main store E, the marking store I, the skeletonizing store J, the logic unit L and the output unit O to form a loop. This can be effected, for example, by interconnecting all said stores as series shift registers. Under the control of the clock pulses and the control unit F, the information of the character is circulated until it has returned in the main store E. The following operations are then effected: In the marking store I the matrix points are marked, or are not marked, in accordance with an edge criterion comparing the information of a matrix point with the state of neighboring matrix points which are either occupied or void. This is effected by the logic unit K, while the information whether or not the relevant matrix point is marked is passed on to the mark store M. The output of the marking store I is connected, via the interconnection unit H, to the input of the skeletonizing store J. In this store the information of marked points is compared with that of the neighboring points in accordance with an indispensability criterion. To this end the mark of the matrix point under consideration, and possibly of other matrix points, is applied from the mark store M to the second logic unit L. The latter unit tests against an indispensability criterion and ecodes whether or not the marked matrix point may be removed. If it may be removed, a signal is applied to the bistable unit N. The information of the removed or non-removed matrix point is returned, via the output unit O, to the main store E and, if desired, is available on an output terminal of the output unit O. At the start of the described cycle, the bistable unit N was in the first position, so that all matrix points are first tested against the edge criterion by the logic unit K. If a point is removed, N receives a pulse from the logic unit L, so that it assumes the second position. After completion of the cycle, a cycle of the same type is performed and, moreover, the bistable unit N is reset to the first position. However, if no point has been removed during a cycle, N is still in the first position at the end thereof. In that case the output of the main store E is directly connected, in a subsequent cycle, to the input of the skeletonizing store J by the interconnection unit H, while the mark store M receives a pulse or a pulse sequence from the control unit F. This causes M to store the information of all points as "marked" in as much as that is applicable. At the end of this cycle the skeletonizing unit is stopped (after supplying the information of the skeleton character via the output unit O), the skeletonizing of a subsequent character commences.

Figure 9:
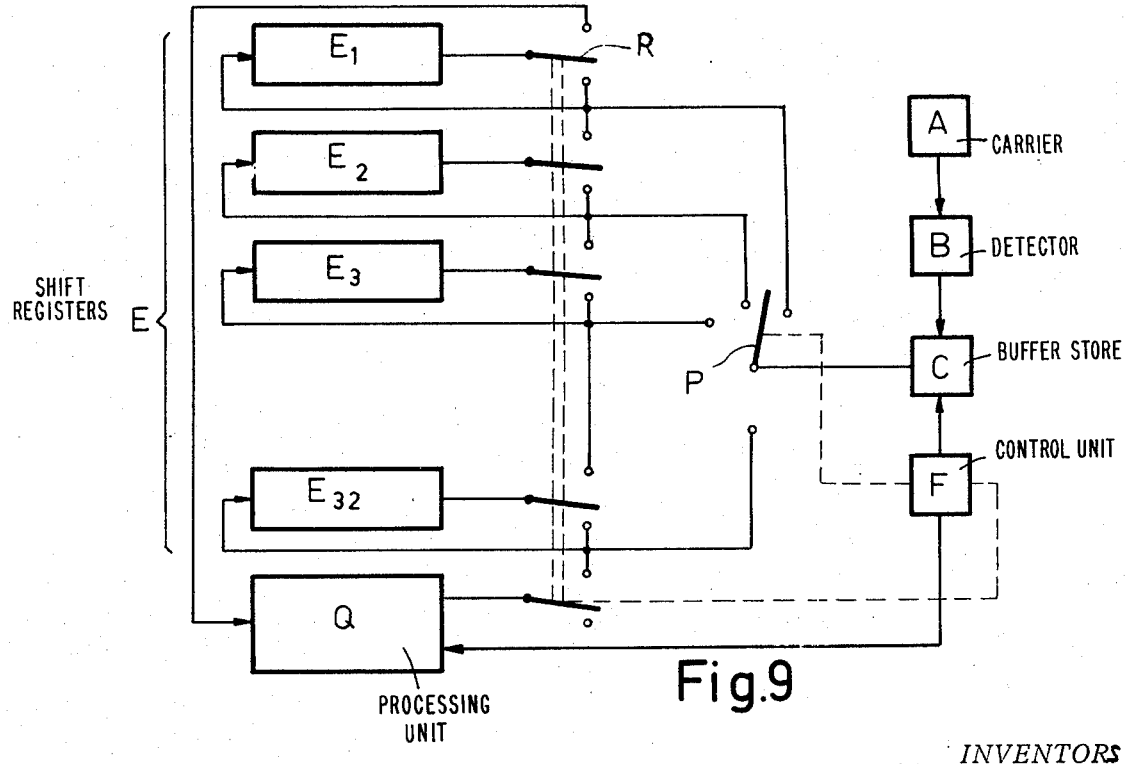
FIG. 9 shows a block diagram of a main store, a marking store and a skeletonizing store.

According to FIG. 9 the main store E is composed of 32 shift registers of 32 bits. Also provided are the switches P and R and the processing unit Q (corresponding to MI and BSI shown in FIG. 7). During writing in, R is in the lower position and the information of the shift registers continuously circulates. The control unit F each time switches P one position further, so that a next shift register is written in. When the 32nd line has been written in, F sets the switch R to the upper position so that all shift registers are connected in series with the processing unit Q.

Figure 10:
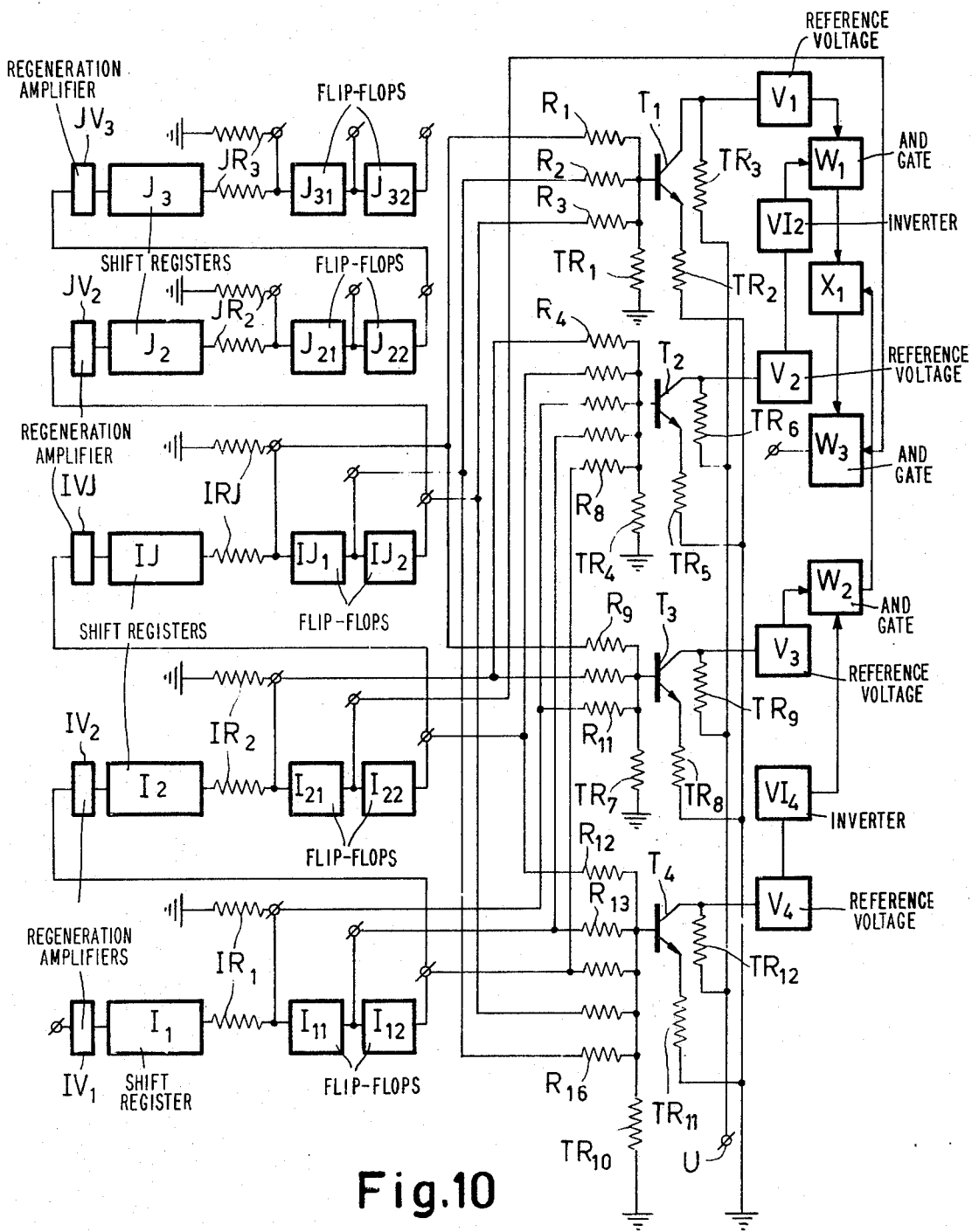
FIG. 10 shows a block diagram of the marking store having a first logic unit.

FIG. 10 shows the marking store I which comprises 3 shift registers I1, I2 and IJ, each for 30 bits. In series therewith are each time connected two flipflops I11, I12, I21, I22, IJ1 and IJ2. Provided between these shift registers and the flipflops are the matching resistors IR1, IR2 and IRJ, and connected before the shift registers are the regeneration amplifiers IV1, IV2 and IVJ. FIG. 10 also shows the skeletonizing store J, comprising three shift registers, i.e. IJ, J2 and J3, with the associated flipflops IJ1, IJ2, J21, J22, J31, J32, resistors IRJ, JR2, JR3 and regeneration amplifiers IVJ, JV2 and JV3. The five shift registers are connected in series. FIG. 10 furthermore shows a portion of the logic unit K which generates the edge criterion and comprises 16 resistors R1 . . . R16, four transistors T1 . . . T4, the electrodes of which are connected to the resistors TR1 . . . TR12, and hence to reference voltages (ground and terminal U), the emitter-followers V1 . . . V4, the inverters and V14, the AND-gates W1, W2 and W3, and the OR-gate X1. Part of the edge criterion is: if the third column of a matrix comprising 3 × 3 character positions has less than two occupied positions and the remainder has more than three (including the central position), the central position is marked. This is achieved as follows: the information of the central character position is present on the output of I21 and is compared with the information on the outputs of IJ1, IJ2, I22, I11, I12, and across the resistors IR1, IR2, IRJ. The information arrives on the input of IV1 and is shifted further to the output of J32 under the control of clock pulses not shown. The character lines are scanned, for example, from left to right so that the character is stored in the main store in a left/right mirror-imaged manner, which also applies to the stores I and J. The last column of the 3 × 3 matrix, consequently, is present in the last bits of the shift registers I1, I2 and IJ and is applied to the base of T3 via the resistors R9 . . . R11. Similarly, the information of the flipflops I11, I12, I22, IJ1 and IJ2 is applied to the base of T4 via the resistors R12 . . . 16. These types of information are always added in the form of currents. The resistors TR1 . . . 12 and the voltage on terminal U are specially proportioned. The relevant output voltage is high for a character position and, consequently, a current flows through the associated resistor, for example, R9.

If more than one resistor of the series R9 . . . 11 is energized, the base voltage of T3 becomes high so that T3 becomes conducting with the result that the associated input voltage of W2 becomes low due to the voltage drop across TR9 and the amplification of this signal in the emitter-follower V3. In the opposite case, this input voltage is high. if more than two of the resistors R12–R16 are energized, T4 is conducting so that the collector-electrode voltage becomes low due to the voltage drop across TR12. This signal is amplified by emitter-follower V4 and is inverted by inverter V14. If both input voltages of the AND-gate W2 are high, the edge criterion is satisfied: last column less then two, the remainder more than three occupied character positions. The same is done in the upper half for the upper row with respect to the remainder of the 3 × 3 matrix. The outputs of the AND-gates W1 and W2 are coupled by the OR-gate X1. A circuit of the kind set forth is also provided for the other two units, but has been omitted for the sake of simplicity. If in at least one of the four units the edge criterion is satisfied, the central character position is marked: to this end the output of I21 is connected, via AND-gate W3, to the output of OR-gate X1. If both voltages are high, the mark signal appears on the output of W3.

Figure 11:
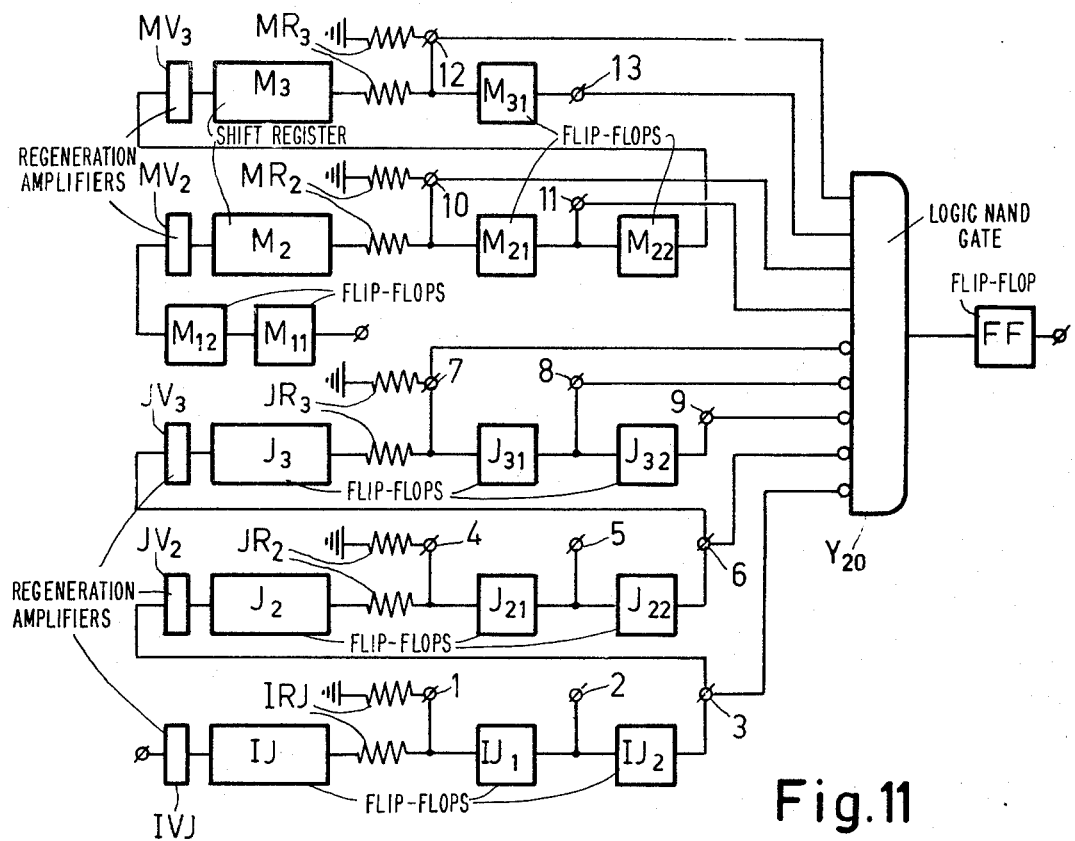
FIG. 11 shows a diagram of an additional portion of the second logic unit, together with the skeletonizing store and the marking store.

FIG. 11 shows the skeletonizing store J, the mark store M and a portion of the second logic unit L. The skeletonizing store again consists of three shift registers of 30 bits with associated regeneration amplifiers, terminating resistors and two flipflops, IJ (IVJ, IRJ, IJ1, IJ2), J2 (JV2, JR2, J21, J22) and J3 (JV3, JR3, J31, J32), respectively. The skeletonizing store and the marking store have the first of these three shift registers in common. The mark store comprises two shift registers of 30 bits, M2 and M3, with associated amplifiers MV2, MV3, terminating resistors MR2, MR3 and five flipflops M11, M12, M21, M22 and M31. The input of M11 is connected to the output of the AND-gate W3 shown in FIG. 10. The output terminals of the stores are numbered 1 . . . 13. Terminal 5 supplies the information of the central character position. The mark arrives on the input of M11 if the central character position has been marked in the marking store. Consequently, the information of M11 relates to that of I21, and that of M31 to that of J21. FIG. 11 also shows a logic NAND-gate Y20 and a flip-flop FF.

Figure 12:
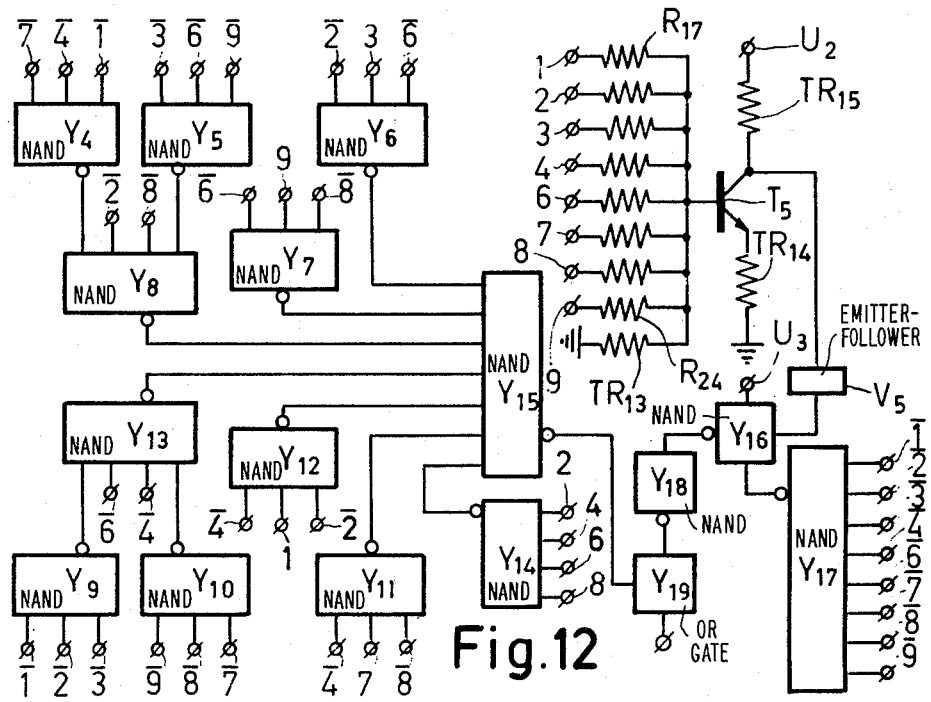
FIG. 12 shows a block diagram of a second logic unit.

FIG. 12 shows the remainder of the second logic unit L which comprises the logic NAND-gates Y4 . . . Y18, the OR-gate Y19, the resistors R17 . . . 24, the transistor T5 with variable resistors TR13 . . . 15, the emitter-follower V5 and the voltage terminals U2 and U3. The operation will be described using positive logic, a high voltage representing a logic 1. The input terminals of the NAND-gates Y4 – 14 are connected to the indicated terminals of the skeletonizing store shown in FIG. 11, a store above a digit indicating that the inverted value of this signal is applied. This is possible in that the inverted signal is present on the output of the flipflops and the last bit of the shift registers. For the sake of simplicity, these additional terminals, however, are not shown. The voltage of NAND-gate Y6, for example, is low only if the voltage of terminal 2 is low, the voltage on terminal 3 is high and the signal on terminal 6 is low. If the position associated with terminal 5 is removed, an interruption will certainly occur because, if the character position is marked, it must have at least two neighbors. The same reasoning applies to the gates Y7, Y11 and Y12. The output voltage of Y6 is applied to Y15: if the output voltage of Y6 is low, the output voltage of Y15 will, consequently, be high. If the voltages on terminals 2, 4, 6, 8 are high, skeletonizing would also cause an interruption, so in that case the output voltage of Y15 is high because the output voltage of Y14 is low. If each time one voltage is high of the terminal voltages 1, 4, 7 and of the terminal voltages 3, 6, 9 while the terminal voltages 2 and 8 are low, an interruption would also occur upon removal of the character poaition associated with terminal 5. The output voltages of Y4 and Y5 are then high, and the voltages on terminals 2 and 8 are low, so that the terminal voltages $\overline{2}$ and $\overline{8}$ are high. The output voltage of Y8 is then low, and that of Y15 is high. A similar reasoning applies to the gates Y9, Y10 and Y13. By taken into consideration that skeletonizing can be effected only if the character position is marked, it appears that interruptions can indeed be avoided by using said circuit if all possibilities are investigated.

The voltages on the terminals 1–4, 6–9 are applied to the base of transistor T5, via the resistors R17 . . . 24. The resistors, connecting the electrodes of T5 to the voltage sources (earth and terminal U2), are proportioned such that T5 becomes conducting if at least two resistors are energized. The relevant input voltage of NAND-gate Y16 then becomes low, and the output voltage of Y16 becomes high. If less than two of the resistors R17 . . . R24 are energized, the relevant input voltage of Y16 is high and if, furthermore, one of the input signals of Y17, i.e. $\overline{1}$ . . . $\overline{4}, \overline{6}$ . . . $\overline{9}$ is low (more than one is impossible as in that case T5 would have been conducting) is low, the second input voltage of Y16 also becomes high so that the output voltage of Y16 is low. However, if none of the signals $\overline{1}$ . . . $\overline{4}, \overline{6}$ . . . $\overline{9}$ is low, the output voltage of Y16 is high. In that case the relevant point is an isolated point without neighbors. This applies only if the voltage on terminal U3 is high. In conjunction with the NAND-gates Y16 and Y17, the associated input terminals etc., the transistor T5 forms that portion of the logic unit L which counteracts erosion of the ends of single series of character positions. Consequently, this portion is active only during the previously mentioned second mode: it is only in that case that a high signal is present on the third input terminal U3 of the NAND-gate Y16. During the said first cycles the voltage on U3 is low and the output voltage of Y16, consequently, is always high, so that the output voltage of Y18 is low and has no effect on the OR-gate Y19. During a cycle of the second mode, the voltage on U3 is high so that none of the ends can be eroded. If the output voltage of the OR-gate Y19 is low, the character position may be removed. To this end the output of Y19 is connected, via a line not shown, to the reset input of the flipflop J21 shown in FIGS. 10 and 11.

The logic NAND-gate Y20 shown in FIG. 11 receives the mark signals from the terminals 10, 11, 12, 13 and also signals if the voltages on terminals 3, 6, 7, 8 and 9 are low, i.e. the output voltage of Y20 is low only if the character positions associated with the terminals 1, 2, 4 and 5 are marked and surrounded by five neighboring positions. This is because M31 corresponds to J21, so terminal 12 to terminal 4 etc. Moreover, for example, the signal on terminal 3 is written in directly before that of terminal 2 etc. Consequently, in that case we find the situation where a block of 4 marked positions follows (in the horizontal and the vertical direction) an edge of neighbors positions, thus being capable of forming an end of a double series of character positions. If the output voltage of Y20 is low, the foregoing is remedied in that the flipflop M21 is reset so that the relevant character position cannot be removed. As this reset signal has to pass the flipflop FF, this is effected one clock pulse later.

The foregoing describes one embodiment of the invention where each position may have eight neighbors. The separation between the various parts of FIG. 8 was not completely maintained in this embodiment. For example, in FIG. 10 the marking store and the skeletonizing store have the shift register IJ and the associated flipflops etc. in common. This saves both time and money. In the case of a 32 × 32 character field, only 37 instead of 38 shift registers have to be passed through. A further reduction of this number can be achieved in that, for example, a part of the main store is constructed as a marking and/or skeletonizing store, in which case the logic units generating the criteria have to be switched off during the writing in phase. Further modifications will be obvious to those skilled in the art.

A problem arises if the character has a width of 32 positions: due to the construction as a shift register, the left-hand and right-hand sides may influence each other. This effect is avoided by making the character field one position narrower than the number of bits in the shift registers of the main store.

In the case that each position has six neighbors, another edge criterion can be given: a character position is marked if it has more than one but less than five neighboring character positions: in that case the application of the second indispensability sub-criterion also becomes superfluous.

In this way many other modifications for realizing the concept of the invention are possible.

What is claimed is:

1. A device for skeletonizing characters imaged on a carrier, according to a two-dimensional regular pattern of positions, said device comprising:

a detector and storage means associated therewith, said detector feeding information of the characters into said storage meeans so that the characters are stored as digital information of character positions and background positions, respectively;

skeletonizing means for receiving and changing information of character positions into those of background positions until the information of character positions have been reduced to information of character positions of skeleton characters whose stroke elements consists of a single series of character positions which succeed each other in accordance with an adjacency criterion, said sketetonizing means comprising a control unit associated with said storage means for controlling skeletonizing of said characters in cycles, said control unit operative in two modes, a first mode having at least one cycle and a second mode having at least one cycle;

a first deciding unit connected to said control unit for receiving during a cycle of the first mode, at least the information of positions neighboring those character positions, said first deciding unit incorporating an edge criterion and associating additional information with the information of the character positions to compare whether said character positions satisfy said edge criterions; and a second deciding unit connected to said first deciding unit for receiving the information of the character positions and those positions neighboring said character positions during said first mode, said second deciding unit incorporating a logic indispensability criterion and comparing the information of said character positions satisfying said edge citerion with said logic indispensability criterion, said second deciding unit receiving during a cycle of said second mode, information of remaining character positions with the logic indispensability criterion regardless of whether said remaining positions satisfy said edge criterion, said second deciding unit having a first and a second circuit for a first and a second indispensibility sub-criterion, respectively, it being possible to activate said circuits by said control unit, said control unit activating only the first circuit during cycles of the first mode, but activating both circuits during cycles of the second mode, said first circuit supplying a signal if removal of a character would cause an interruption between two character positions still present, said second circuit counting the number of character positions neighboring said character positions, and supplying a signal if this number amounts to one, which means that the character position constitutes an end of a character which might other wise be unduly eroded by removal of said character position, the second deciding unit being capable of preventing the removal of a relevant character position under the control of at least one of said signals.

2. A device as claimed in claim 1, wherein the information of the character positions is supplied to the second deciding unit in a fixed sequence, said second deciding unit comprising a third circuit for a third indispensability sub-criterion which compares the information of character positions with the information of at least three character positions neighboring this character position, said third circuit supplying a signal when these character positions, forming a block, are all provided with said additional information, and may furthermore have a number of background positions as neighboring positions so that said block can constitute an end of a character which end might otherwise be unduly eroded by removal of end character positions without the subcriteria generated by said first and second circuit, said signal of said third circuit capable of changing the additional information of these end character positions such that an end character position is not tested against said first and second indispensability criterion.

3. A device as claimed in claim 2, wherein a bistable device is provided, having a first position and a second position, and a counter, the said first position controlling the said first mode and the said second position controlling the said second mode, the bistable device being set to the first position at the beginning of a cycle of said first mode by a start signal, said counter counting the removed signals of removed character positions and supplying a signal when a given position is reached, so that at the end of that cycle, said start signal can be generated, where, if said position is not reached during a cycle of said first mode, the bistable device reaches the second position at the end of that cycle, it being possible to generate a signal at the end of a cycle of said second mode in order to signal the completion of skeletonizing.

* * * * *

UNITED STATES PATENT AND TRADEMARK OFFICE
CERTIFICATE OF CORRECTION

PATENT NO. : 3,975,709
DATED : August 17, 1976
INVENTOR(S) : MATTHIJS BEUN ET AL It is certified that error appears in the above-identified patent and that said Letters Patent are hereby corrected as shown below:

```
Column  1, line 17, "daid" should be --said--
           line 52, "skeleton skeleton" should be --skeleton--
Column  2, line  9, "making" should be --marking--
Column  3, line 17, "present" should be --preset--
           line 18, "to" should be --or--
Column  6, line 14, "an" should be --and--
Column  8, line 61, "ecodes" should be --decides--

Column 10, line 60, "1" should be --"l"--
Claim   1, line  6, "meeans" should be --means--
```

Signed and Sealed this

Twenty-first Day of June 1977

[SEAL]

Attest:

RUTH C. MASON
*Attesting Officer*

C. MARSHALL DANN
*Commissioner of Patents and Trademarks*